Figure 3:
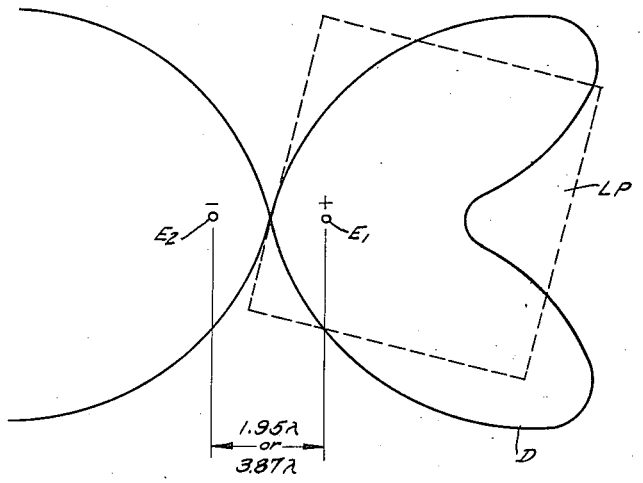

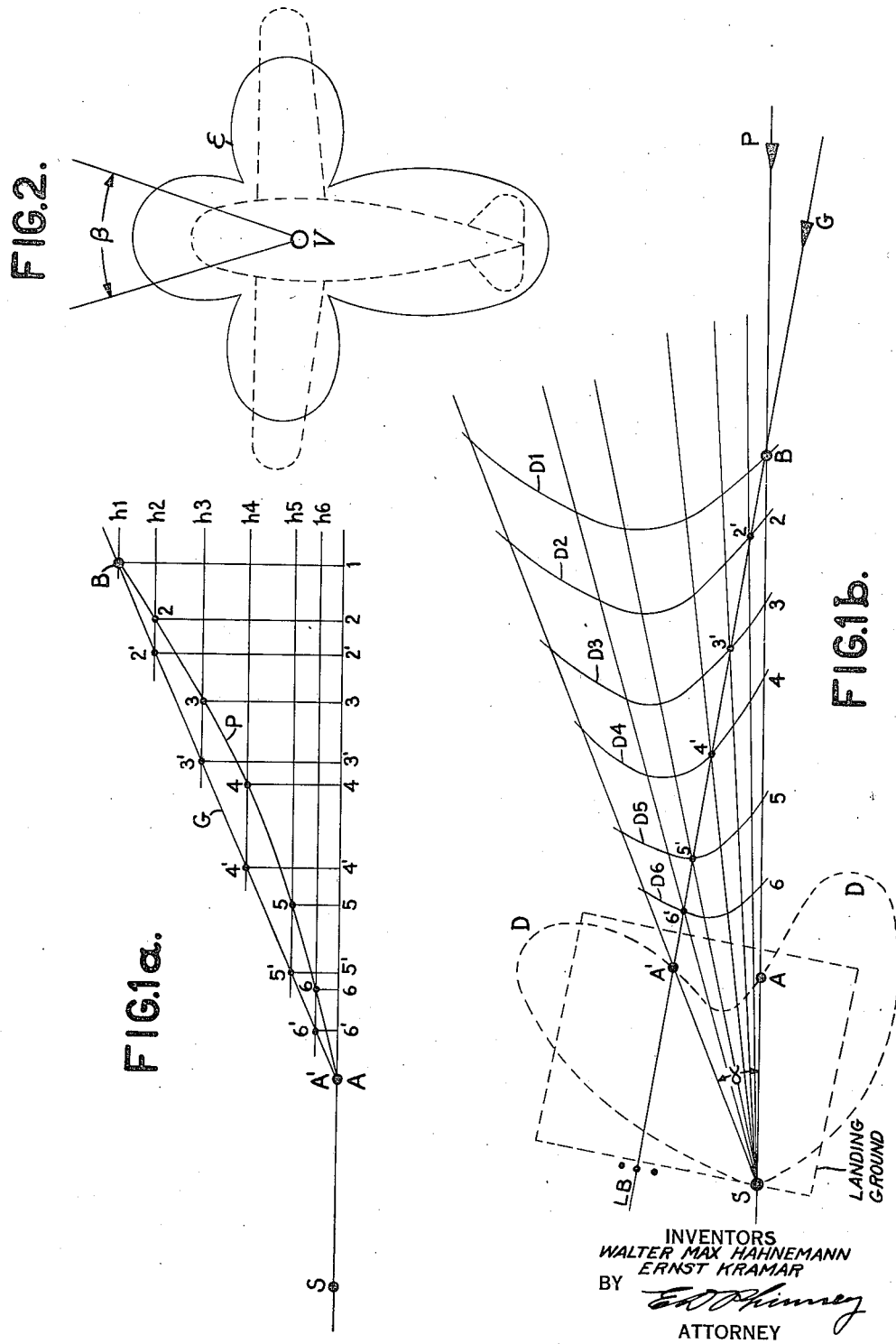

May 13, 1941.  W. M. HAHNEMANN ET AL  2,241,907
LANDING METHOD AND SYSTEM FOR AIRCRAFT
Filed Dec. 7, 1938  2 Sheets-Sheet 2

INVENTORS
WALTER MAX HAHNEMANN
ERNST KRAMAR
BY
ATTORNEY

Patented May 13, 1941

2,241,907

UNITED STATES PATENT OFFICE 2,241,907

LANDING METHOD AND SYSTEM FOR AIRCRAFT

Walter Max Hahnemann and Ernst Kramar, Berlin, Germany, assignors to C. Lorenz Aktiengesellschaft, Berlin-Tempelhof, Germany, a company Application December 7, 1938, Serial No. 244,440
In Germany June 7, 1938

11 Claims. (Cl. 250—11)

In aircraft navigation landing systems are known which are based on the glide path or slip-way principle. Landing is here effected along energy lines of constant field intensity which belong to a spatial radiation diagram or pattern. Such radiation patterns are in general produced by means of transmitting arrangements operated on ultra short waves and by which in consequence of the special spreading properties of this wave range a club-shaped radiation diagram is obtained. The landing lines so produced are parabolic curves and therefore have the disadvantage of being too steep at higher altitudes and too flat near the earth, so that the airplane in order to land has to begin with a step descent and finally has to fly in close proximity to the earth's surface. This mode of landing is unsafe because the pilot when flying along the ground must employ approximately full motor power and will thus land with a dangerous speed. It is therefore sought to produce glide paths which are in the nature of plane or at least approximately plane surfaces, thus enabling the aeroplanes to follow a rectilinear path when descending. The said steep descent will be avoided in this way, and the aeroplane may consequently fly downward with a constant speed and land safely with throttled motors.

The invention is concerned with the shaping and production of such advantageous landing paths. To such end a spatial radiation pattern of special form is produced and this radiation pattern is in a special manner cut by the path of the aeroplane when flying toward the transmitter. The arrangement is such that the horizontal directive effect, that is, the horizontal projection of the radiation pattern, will aid in landing, predetermined landing curves, particularly curves of rectilinear kind, resulting from the cooperation of this radiation pattern with the vertical radiation diagram.

In accordance with the invention a spatial radiation pattern is employed which is so shaped and is intended to be so cut by the flying-path that, viewed in the horizontal projection, the field intensity shall first decrease during landing and then when approaching the landing point shall increase again. The special mode of cutting the radiation pattern requires that the transmitter, that is, the antenna system which serves for the production of the spatial radiation pattern, is in general laterally spaced away from the flying-path by a certain distance.

In accordance with a further feature of the invention the radiation conditions are so calculated that the antenna characteristic of the receiver shall not affect the act of landing while slight deviations from the course line, namely deviations due to the width of the guide beam used for aiding the arriving airplane shall not cause the predetermined landing curves to undergo distortions.

Figure 3A:
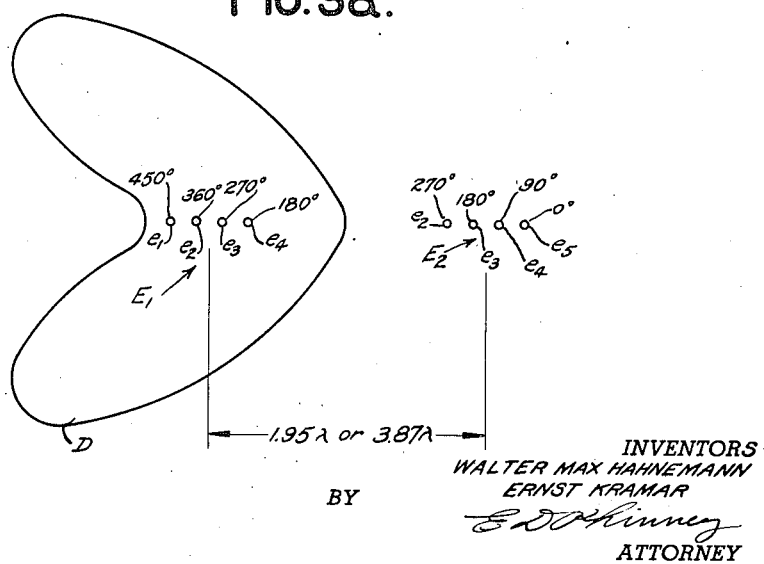

The invention will be understood from the following description, reference being had to the accompanying drawing, in which Fig. 1a is a vertical characteristic that serves to explain a certain feature of the invention, while Fig. 1b shows the appertaining horizontal projection of the radiation pattern. Fig. 2 is a diagram that serves to disclose a further feature of the invention. Fig. 3 shows an antenna arrangement for producing a desired horizontal radiation pattern and Fig. 3a shows a modification thereof.

In Fig. 1a, S denotes the transmitter which is employed for producing the landing lines. Let us assume that the landing point is located at A and that the act of landing is begun in point B. If the measures provided by the invention are not adopted and if the aeroplane is flying directly toward transmitter S in the usual manner, then landing line P is in the shape of a parabolic curve owing to the ultra short waves being reflected by the earth's surface. The invention has for its object to obtain a landing curve of constant field intensity and which allows the aeroplane to descend with constant speed, that is to say, a landing curve which is in the shape of a straight line G. For simplicity it is assumed by way of example that the line G and curve P have point B common to them and that the landing points A', A are equidistant from transmitter S. In order to explain the novel method the lines P, G of constant field intensities are sectioned at the levels $h_1$ to $h_6$. From this representation it can be seen how the parabolic curve P will change into the straight line G, namely under the influence of a measure by which the points 2 to 6 of the curve P are displaced to assume the positions 2' to 6' in line G. The bottom points belonging to the points 2 to 6 and those belonging to the points 2' to 6' are denoted by the same numerals.

Such displacement of the field intensity points of curve P is effected by the aforesaid measures and will be fully understood from Fig. 1b.

It is supposed here that there is the parabolic vertical characteristic when the airplane is flying along line P directly toward transmitter S. The points 2 to 6 of the curve P are marked also in Fig. 1b. The point B, in which the landing is commenced, and the landing point A are likewise represented in Fig. 1b.

In accordance with the invention the aeroplane is not flying in the direction P but in the direction G shown in Fig. 1b, that is to say, the radiation diagram is cut by the flying-path in lateral direction. In this line G the points 2' to 6' and the landing point A' are marked in accordance with the representation of Fig. 1a. Point B is common to the two landing directions, as stated before. By shaping the horizontal projection of the spatial diagram accordingly the field intensity points 2 to 6 are caused to change into the points 2' to 6'. This is attained if the field intensity in the horizontal projection first decreases during the act of landing and then on approaching the landing point increases again. The requisite shape of the curve is ascertained graphically by constructing the enveloping curve by steps. The respective diagrams are shown in Fig. 1b, being designated D1 to D6, and are the horizontal projection of the sections made at the levels $h1$ to $h6$, Fig. 1a. In this way it is obtained by the proper shaping of the horizontal diagram that the field intensity along line G shall be of constant value between B and A'.

A horizontal radiation pattern which fulfils the above mentioned requirements is shown by dashes in the Fig. 1b and is designated D. The interesting range of this diagram within the angle $\alpha$ is utilized according to this invention. Such a diagram may, for instance, be set up by means of two individual antennae which are energized in phase opposition and which are spaced apart at a distance equal to 3.87 $\lambda$ or even 1.95 $\lambda$ when $\lambda$ designates the wavelength as, for instance, shown in Fig. 3. The two individual antennae are designated E1 and E2. The bend in this diagram may be varied, that is, may be rendered more or less sharp by varying the distance between the antennae. A backward radiation may be suppressed by the use of an antenna structure as shown in Fig. 3a. The antenna structures consist of two groups of radiators E1 and E2 which are spaced apart at a distance equal to 3.87 $\lambda$. Each group consists of four individual antennae $e1$, $e2$, $e3$, $e4$, which are spaced apart from one another at a distance equal to $\lambda/4$ and corresponding antennae in the respective groups are energized in phase opposition as indicated by the angular degrees at the top of each transmitter. Also in this case the sharpness of the bend of a radiation pattern may be varied by changing the distance between the groups E1 and E2 of antennae. In the Figs. 3, 3a, D designates the horizontal diagram while LP denotes the boundary of the landing place.

The novel landing system requires to consider the fact that during the flight along line G and between the points B and A' the angle of incidence of the radiation toward the receiving antenna is varying since the transmitter is located laterally of the landing path G. This is not of disadvantage if the receiving antenna has the same reception properties with respect to any direction, its characteristic being of the ideal circular shape. This characteristic however cannot be obtained in any case if metallic aeroplanes are concerned, because the metallic hull thereof and the supporting surfaces of the aeroplane act to deform the reception diagram in a manner that minima arise in the angle bisectrix between each supporting surface and the hull of the aeroplane.

This case is represented in Fig. 2 in which the reception diagram of a vertical antenna V is designated E. This diagram shows the reception effect within an angle $\beta$ to be approximately constant. Therefore, in accordance with a further feature of the invention transmitter S is so positioned that on the receiving side the angle of incidence shall undergo a variation of slight extent only, namely a variation by which the angle $\beta$, within which a fairly constant reception level is enabled, is not exceeded during landing.

The landing direction G is indicated by a separate directional transmitter LB, Fig. 1b, which is operating after the manner of radiation diagrams alternately keyed in the rhythm of complementary signals, that is to say, signals completing one another to form a continuous dash along line G, this being the case of the so-called guide beam beacons.

The use of such guide beam transmitters however involves that the aeroplane will not always follow exactly the same course. Therefore it should be avoided that such slight deviations entail a substantial deformation of the landing line in vertical direction. This requirement is fulfilled by selecting accordingly the position of the transmitter and by selecting also the horizontal projection of the radiation diagram, and is in particular fulfilled by ensuring that the decrease and increase of the field intensity, viewed in the horizontal projection, be not too great during the flight toward the transmitter.

The here discussed dimensioning of the radiation diagram is in no wise limited to the production of rectilinear landing paths but any other suitable paths may be produced, such as those which provide for the aeroplanes having to fly above houses or other obstacles at the boundary of the landing ground. This requirement is fulfilled by calculating accordingly the horizontal projection and its location in relation to the landing path.

What is claimed is:

1. In a system for landing aircraft which comprises a radiating means for producing a guide path radiation pattern, the landing plane of which is indicated by a receiving means to indicate points of constant field intensity, the method of producing a glide path which comprises, producing and radiating a wave from a first point to form a radiation pattern having a predetermined curve of constant field intensity in a vertical plane, producing and radiating from a second point spaced from said first point a wave having a radiation pattern intersecting with said first named pattern at such an angle as to establish points of constant field intensity defining a substantially rectilinear landing curve for an aircraft.

2. In a system for landing aircraft which comprises a radiating means for producing a guide path radiation pattern, the landing plane of which is indicated by a receiving means to indicate points of constant field intensity, the method of producing a glide path which comprises, producing and radiating a wave from a first point to form a radiation pattern having a predetermined curve of constant field intensity in a vertical plane, producing and radiating from a second point spaced from said first point a wave having a radiation pattern forming a guide line for aircraft intersecting with said first named pattern at such an angle as to establish points of constant field intensity on a locus defining a substantially rectilinear inclined plane.

3. The method according to claim 2, further comprising producing said beam forming a guide line by separate radiations the amplitude comparison of which define the guiding beam, and adjusting said first radiation pattern to define said constant intensity landing line at substantially the radiation center of said guide line.

4. A method according to claim 2, further comprising so shaping said first radiation pattern with respect to said second named pattern that the field intensity in horizontal projection of said radiation pattern decreases a given amount upon approaching the point of landing and then increases again upon further approach.

5. A method according to claim 2, further comprising adjusting said receiving means so that its receiving pattern in the direction of flight during landing is such that minor variations in the angular relation of the receiving means with respect to the guiding path do not vary the apparent shape of the landing path as indicated at the receiving point.

6. A system for landing aircraft, comprising means for producing a radiation pattern for guiding said aircraft in a particular azimuthal direction, and means spaced from said first named means for producing a second radiation pattern having a predetermined curve of constant intensity in a vertical direction and being directed in a different azimuthal direction to intersect said first named radiation, said last named means comprising radiators for producing a pattern of such radiation field strength that the constant intensity line formed along said particular azimuthal direction by said second radiation pattern is a substantially rectilinear line inclined to the landing surface.

7. A system according to claim 6, wherein said means for producing a second radiation pattern comprises two antennae fed in phase opposition and spaced apart by a distance equal to an integral multiple of 1.95 wavelengths at the operating frequency.

8. A system according to claim 6, wherein said means for providing a second radiation pattern comprises two radiator groups spaced apart by a distance of substantially 3.87 wavelengths and fed in phase opposition, each such group consisting of four radiators spaced apart by a distance equal to an odd multiple of a quarter wavelength and means for alternately feeding said radiators in phase opposition.

9. In a system for landing aircraft which comprises means for producing a glide path radiation pattern the landing plane of which is indicated by a receiving means on an aircraft, the method which comprises producing and radiating a wave from a first point to form a radiation pattern having a predetermined pattern of intensity in a vertical plane and a predetermined horizontal directivity, producing an indication for guiding said aircraft along a path in a plane laterally spaced from said first point and intersecting said pattern along a predetermined line and guiding said aircraft along said path and at an elevation determined by said radiation pattern to follow a predetermined desired line of landing.

10. A system for guiding aircraft to a landing point, comprising means for indicating on an aircraft a predetermined course line, and radiating means spaced laterally on one side only of said course line and producing a directive radiation pattern having a directive axis overlapping said predetermined line, the angular relation of said pattern and said predetermined course line being such that the energy from said radiating means received on said aircraft traversing said line produces a glide path along a desired landing curve.

11. A system according to claim 10 wherein said radiating means comprises a pair of antennae spaced apart by predetermined distance and fed in phase opposition.

WALTER MAX HAHNEMANN,
ERNST KRAMAR.